United States Patent
Suzuki et al.

(10) Patent No.: US 6,519,676 B1
(45) Date of Patent: Feb. 11, 2003

(54) METHOD FOR READING A CD HAVING CD-TEXT DATA

(75) Inventors: Yosuke Suzuki, Kanagawa (JP); Masahiro Takahashi, Tokyo (JP); Kazushige Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/253,744

(22) Filed: Feb. 22, 1999

(30) Foreign Application Priority Data

Feb. 25, 1998 (JP) .................................. 10-043458

(51) Int. Cl.⁷ .............. G06F 12/00; G11B 27/36
(52) U.S. Cl. .............. 711/112; 711/4; 711/111; 369/30.04; 369/30.08; 369/30.25
(58) Field of Search ................ 369/30–43, 58; 711/4, 111, 112

(56) References Cited

U.S. PATENT DOCUMENTS

| 5,889,746 A | * | 3/1999 | Moriyama et al. ......... 369/58 |
| 5,959,945 A | * | 9/1999 | Kleiman ................... 369/30 |
| 6,031,797 A | * | 2/2000 | Van Ryzin et al. ......... 369/33 |
| 6,067,282 A | * | 5/2000 | Moriyama et al. ......... 369/58 |
| 6,111,824 A | * | 8/2000 | Benson .................... 369/33 |
| 6,118,450 A | * | 9/2000 | Proehl et al. ............. 345/349 |
| 6,339,561 B2 | * | 1/2002 | Yokota et al. ............. 369/30.08 |

FOREIGN PATENT DOCUMENTS

| EP | 0448378 | | 9/1991 | |
| EP | 798-723 A2 | * | 1/1997 | ............ G11B/27/30 |
| EP | 0757349 | | 2/1997 | |
| EP | 0772198 | | 5/1997 | |
| EP | 762-422 A2 | * | 12/1997 | ............ G11B/27/00 |
| EP | 0821358 | | 1/1998 | |
| JP | 08030364 | | 2/1996 | ............ G06F/3/02 |
| JP | 08194462 A | | 7/1996 | ............ G09G/5/24 |
| JP | 09265370 A | | 10/1997 | ............ G06F/3/14 |

OTHER PUBLICATIONS

Sony Press Release (As of Sep. 13, 2000). http://www.sony-cp.com/_E/News/news48.html. Munich, Jan. 1997.*
"CD-Text" definition (As of Sep. 13, 2000). http://www.cdpage.com/Compact_disc_Variations/cdtext.html.*
"CD Text" information. (As of Sep. 13, 2000). http://www.disctronics.co.uk/cdref/cdaudio/cdtext.htm.*

* cited by examiner

Primary Examiner—Than Nguyen
(74) Attorney, Agent, or Firm—Jay H. Maioli

(57) ABSTRACT

To determine whether a record medium loaded on a drive has character information in a management area of the record medium corresponding to data received from the drive and to obtain the character information when the record medium has the character information as the determined result. A system includes an optical disc drive and a host computer 53 connected through an interface 42, wherein the drive has a servo and signal processing portion 30, a system controller 41, and a CD-ROM signal processing portion 50. The servo and signal processing portion 30 reproduces data from a disc 21. The system controller 41 controls the entire operation of the drive. Return data is sent from the drive to the host computer 53 corresponding to a read table of contents (TOC) command received from the host computer 53. A code that represents the data length is contained in a header of the return data. With the code, it is determined whether or not the disc 21 is a CD-TEXT disc. When the, disc is a CD-TEXT disc as the determined result, the read TOC command is re-issued. Thus, CD-TEXT data is obtained.

6 Claims, 22 Drawing Sheets

Fig. 5

| FRAME | P | Q | R | S | T | U | V | W |
|---|---|---|---|---|---|---|---|---|
| | | | | S0 | | | | |
| F01 | | | | | | | | |
| F02 | | | | S1 | | | | |
| F03 | P01 | Q01 | R01 | S01 | T01 | U01 | V01 | W01 |
| F04 | P02 | Q02 | R02 | S02 | T02 | U02 | V02 | W02 |
| ... | ... | ... | ... | ... | ... | ... | ... | ... |
| F95 | P93 | Q93 | R93 | S93 | T93 | U93 | V93 | W93 |
| F96 | P94 | Q94 | R94 | S94 | T94 | U94 | V94 | W94 |
| F97 | P95 | Q95 | R95 | S95 | T95 | U95 | V95 | W95 |
| F98 | P96 | Q96 | R96 | S96 | T96 | U96 | V96 | W96 |

137

S0=0010000000000001
S1=0000000000010010

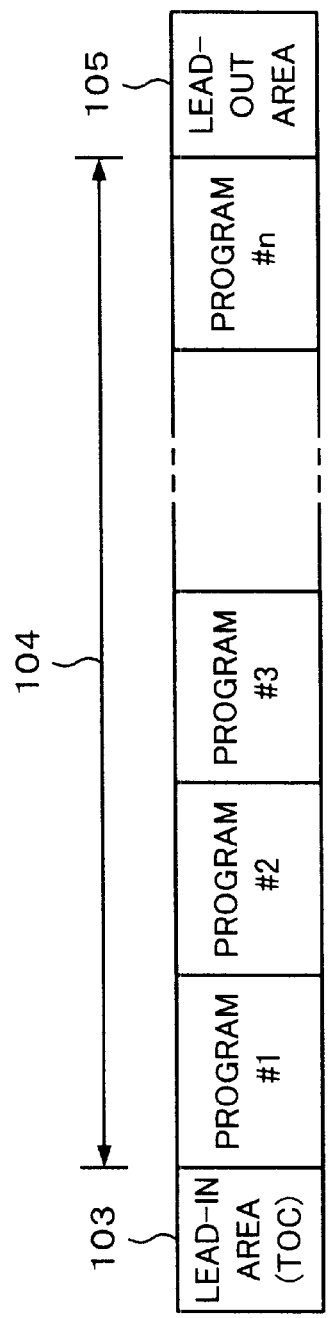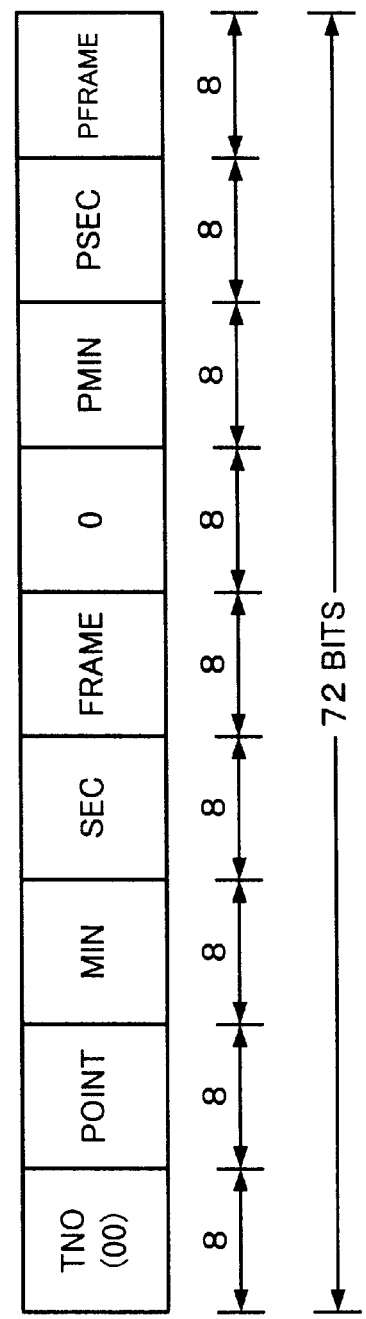
Fig. 6A
Fig. 6B

Fig. 7

| TNO | BLOCK | POINT | PMIN,PSEC,PFRAME | |
|---|---|---|---|---|
| 00 | n | 01 | 00. 02. 32 | ⎫ START POINT OF TRACK #1 |
|  | n + 1 | 01 | 00. 02. 32 | ⎬ |
|  | n + 2 | 01 | 00. 02. 32 | ⎭ |
|  | n + 3 | 02 | 10. 15. 12 | ⎫ START POINT OF TRACK #2 |
|  | n + 4 | 02 | 10. 15. 12 | ⎬ |
|  | n + 5 | 02 | 10. 15. 12 | ⎭ |
|  | n + 6 | 03 | 16. 28. 63 | ⎫ START POINT OF TRACK #3 |
|  | n + 7 | 03 | 16. 28. 63 | ⎬ |
|  | n + 8 | 03 | 16. 28. 63 | ⎭ |
|  | n + 9 | 04 | • • | |
|  | n + 10 | 04 | • • | |
|  | n + 11 | 04 | • • | |
|  | n + 12 | 05 | • • | |
|  | n + 13 | 05 | • • | |
|  | n + 14 | 05 | • • | |
|  | n + 15 | 06 | 19. 00. 03 | ⎫ START POINT OF TRACK #6 |
|  | n + 16 | 06 | 19. 00. 03 | ⎬ |
|  | n + 17 | 06 | 19. 00. 03 | ⎭ |
|  | n + 18 | A0 | 01. 00. 00 | ⎫ TRACK NUMBER OF FIRST TRACK OF DISC |
|  | n + 19 | A0 | 01. 00. 00 | ⎬ |
|  | n + 20 | A0 | 01. 00. 00 | ⎭ |
|  | n + 21 | A1 | 06. 00. 00 | ⎫ TRACK NUMBER OF LAST TRACK OF DISC |
|  | n + 22 | A1 | 06. 00. 00 | ⎬ |
|  | n + 23 | A1 | 06. 00. 00 | ⎭ |
|  | n + 24 | A2 | 52. 48. 41 | ⎫ START POINT OF LEAD-OUT AREA |
|  | n + 25 | A2 | 52. 48. 41 | ⎬ |
| 00 | n + 26 | A2 | 52. 48. 41 | ⎭ |
| 00 | n + 27 | 01 | 00. 02. 32 | ⎫ REPEATED |
|  | n + 28 | 01 | 00. 02. 32 | ↓ |
|  |  |  | • • | |
|  |  |  | • • | |

ITEM
80h=ALBUM NAME/SONG NAME
81h=PERFORMER NAME/CONDUCTOR NAME/ORCHESTRA NAME
82h=SONG WRITER NAME
83h=COMPOSER NAME
84h=ARRANGER NAME
85h=MESSAGE
86h=DISC ID
87h=SEARCH KEYWORD
88h=TOC
89h=2ND TOC
8ah=RESERVED
8bh=RESERVED
8ch=RESERVED
8dh=CLOSED INFORMATION
8eh=UPC/EAN AND ISRC
8fh=BLOCK SIZE

TRACK NO. 1 TO 99 (00h TO 63h)

BLOCK SEQUENTIAL NUMBER RANGING FROM 00 TO 255 (0h TO FFh)

Fig. 16

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 8fh | PACK ELEMENT 00h | SEQUENTIAL NUMBER | BLOCK NO. | CHARCTER CODE OF CURRENT BLOCK | FIRST TRACK NUMBER | LAST TRACK NUMBER | MODE 2 & COPY PROTEC- TION FLAG | NUMBER OF PACKS OF ID1=80h | NUMBER OF PACKS OF ID1=81h | NUMBER OF PACKS OF ID1=82h | NUMBER OF PACKS OF ID1=83h | NUMBER OF PACKS OF ID1=84h | NUMBER OF PACKS OF ID1=85h | NUMBER OF PACKS OF ID1=86h | NUMBER OF PACKS OF ID1=87h | |

Fig. 17

| ID1 | ID2 | ID3 | ID4 | text1 | text2 | text3 | text4 | text5 | text6 | text7 | text8 | text9 | text10 | text11 | text12 | CRC |
|---|---|---|---|---|---|---|---|---|---|---|---|---|---|---|---|---|
| 8fh | PACK ELEMENT 01h | SEQUENTIAL NUMBER | BLOCK NO. | | | | | | | | | | | | | |

- NUMBER OF PACKS OF ID1=88h (text1)
- NUMBER OF PACKS OF ID1=89h (text2)
- NUMBER OF PACKS OF ID1=8ah (text3)
- NUMBER OF PACKS OF ID1=8bh (text4)
- NUMBER OF PACKS OF ID1=8ch (text5)
- NUMBER OF PACKS OF ID1=8dh (text6)
- NUMBER OF PACKS OF ID1=8eh (text7)
- NUMBER OF PACKS OF ID1=8fh (text8)
- LAST SEQUENTIAL NUMBER OF BLOCK 0 (text9)
- LAST SEQUENTIAL NUMBER OF BLOCK 1 (text10)
- LAST SEQUENTIAL NUMBER OF BLOCK 2 (text11)
- LAST SEQUENTIAL NUMBER OF BLOCK 3 (text12)

| LANGUAGE CODE (HEXADECIMAL) | LANGUAGE | LANGUAGE CODE (HEXADECIMAL) | LANGUAGE |
|---|---|---|---|
| 00 | Unknown/not applicable | 20 | Polish |
| 01 | Albanian | 21 | Portuguese |
| 02 | Breton | 22 | Romanian |
| 03 | Catalan | 23 | Romansh |
| 04 | Croatian | 24 | Serbian |
| 05 | Welsh | 25 | Slovak |
| 06 | Czech | 26 | Slovene |
| 07 | Danish | 27 | Finnish |
| 08 | German | 28 | Swedish |
| 09 | English | 29 | Turkish |
| 0A | Spanish | 2A | Flemish |
| 0B | Esperanto | 2B | Walloon |
| 0C | Estonian | 2C | |
| 0D | Basque | 2D | |
| 0E | Faroese | 2E | |
| 0F | French | 2F | |
| 10 | Frisian | 30 | ⎞ |
| 11 | Irish | 31 | ⎟ |
| 12 | Gaelic | 32 | ⎟ |
| 13 | Galician | 33 | ⎟ |
| 14 | Icelandic | 34 | ⎟ |
| 15 | Italian | 35 | ⎟ |
| 16 | Lappish | 36 | ⎟ |
| 17 | Latin | 37 | Reserved for |
| 18 | Latvian | 38 | national assignment |
| 19 | Luxembourgian | 39 | ⎟ |
| 1A | Lithuanian | 3A | ⎟ |
| 1B | Hungarian | 3B | ⎟ |
| 1C | Maltese | 3C | ⎟ |
| 1D | Dutch | 3D | ⎟ |
| 1E | Norwegian | 3E | ⎟ |
| 1F | Occitan | 3F | ⎠ |

Fig. 20

| LANGUAGE CODE (HEXADECIMAL) | LANGUAGE | LANGUAGE CODE (HEXADECIMAL) | LANGUAGE |
|---|---|---|---|
| 7F | Amharic | 5F | Marathi |
| 7E | Arabic | 5E | Ndebele |
| 7D | Armenian | 5D | Nepali |
| 7C | Assamese | 5C | Oriya |
| 7B | Azerbijani | 5B | Papamiento |
| 7A | Bambora | 5A | Persian |
| 79 | Belorussian | 59 | Punjabi |
| 78 | Bengali | 58 | Pushtu |
| 77 | Bulgarian | 57 | Quechua |
| 76 | Burmese | 56 | Russian |
| 75 | Chinese | 55 | Ruthenian |
| 74 | Churash | 54 | Serbo-Croatian |
| 73 | Dari | 53 | Shona |
| 72 | Fulani | 52 | Sinhalese |
| 71 | Georgian | 51 | Somali |
| 70 | Greek | 50 | Sranan Tor |
| 6F | Gujurati | 4F | Swahili |
| 6E | Gurani | 4E | Tadzhik |
| 6D | Hausa | 4D | Tamil |
| 6C | Hebrew | 4C | Tatar |
| 6B | Hindi | 4B | Telugu |
| 6A | Indonesian | 4A | Thai |
| 69 | Japanese | 49 | Ukrainian |
| 68 | Kannada | 48 | Urdu |
| 67 | Kazakh | 47 | Uzbek |
| 66 | Khmer | 46 | Vietnamese |
| 65 | Korean | 45 | Zulu |
| 64 | Laotian | 44 | |
| 63 | Macedonian | 43 | |
| 62 | Malagasay | 42 | |
| 61 | Malaysian | 41 | |
| 60 | Moldavian | 40 | |

Fig. 22A

READ COMMAND

| BIT<br>BYTE | 7 | 6 | 5 | 4 | 3 | 2 | 1 | 0 |
|---|---|---|---|---|---|---|---|---|
| 0 | \multicolumn{8}{c}{OPERATION CODE (43h)} ||||||||
| 1 | | | | | | | MSF | |
| 2 | | | | | FORMAT ||||
| 3 | | | | | | | | |
| 4 | | | | | | | | |
| 5 | | | | | | | | |
| 6 | \multicolumn{8}{c}{TRACK/SECTION NUMBER (Hex)} ||||||||
| 7 | (MSB) ALLOCATION LENGTH ||||||||
| 8 | (LSB) ||||||||
| 9 | CONTROL ||||||||

Fig. 22B

| FORMAT FIELD | RETURN DATA |
|---|---|
| 0000(0) | TOC |
| 0001(1) | SESSION INFO |
| 0010(2) | Full TOC |
| 0011(3) | PMA |
| 0100(4) | ATIP |
| 0101(5) | CD-TEXT |

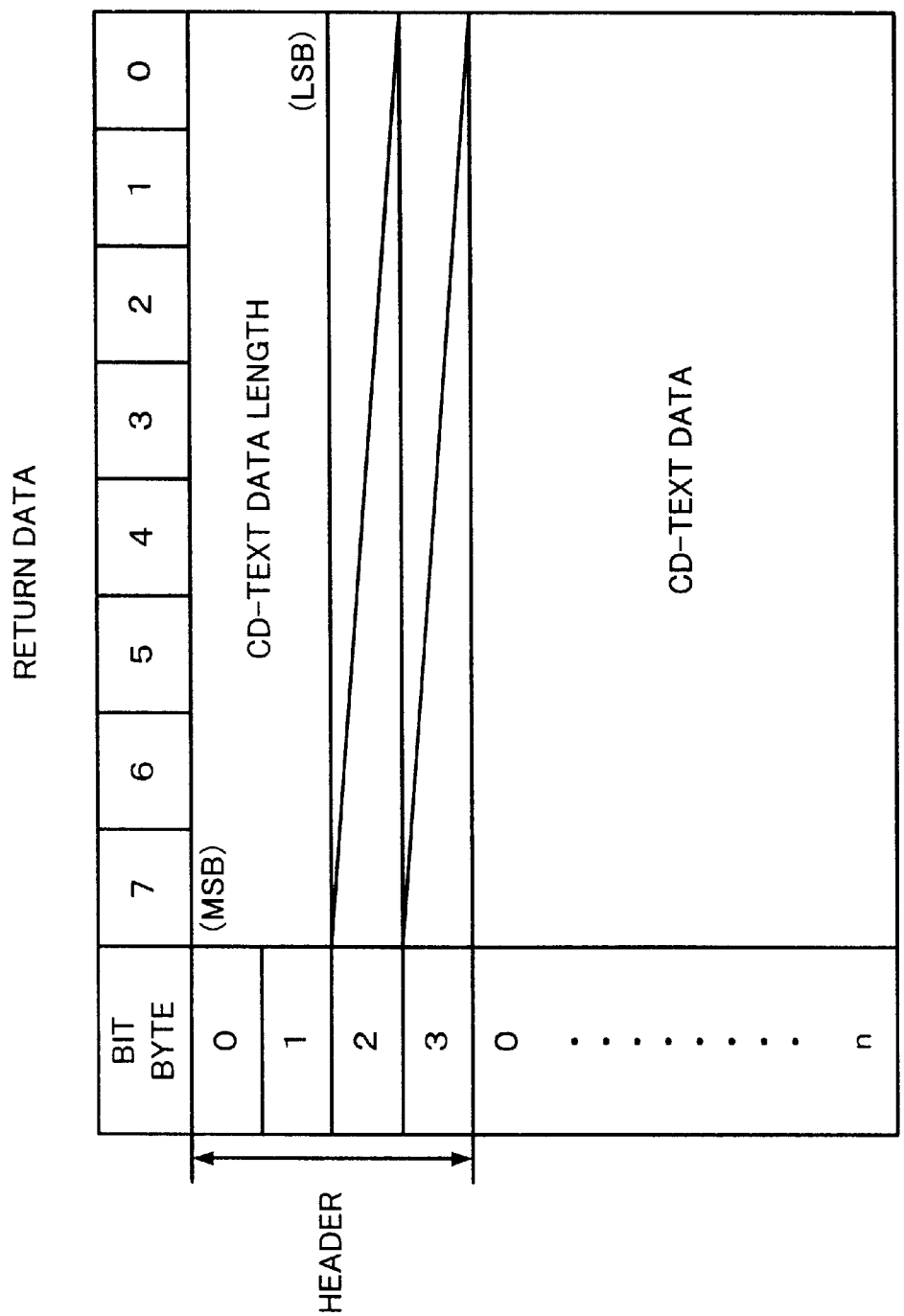

METHOD FOR READING A CD HAVING CD-TEXT DATA

BACKGROUND OF THE INVENTION

1. Field of the Invention

The present invention relates to a reproducing method for reproducing data from a record medium for example a digital audio CD (Compact Disc), in particular, a reproducing method being accomplished as an application program of a computer and a computer readable record medium on which such an application program has been recorded.

2. Description of the Related Art

As storing units for computers, CD-ROMs that feature large storage capacity, high speed access, low cost, and so forth and their drives have been widely used. A CD-ROM is a derivative of a CD-DA (simply referred to as CD) on which a digital audio signal is recorded. Normally, computer data such as an application program is recorded on a CD-ROM. As an application of a personal computer, an application program that allows a CD-ROM drive of a personal computer to function as a CD player is known.

In a conventional CD player (dedicated unit), for user's convenience, various types of information corresponding to reproduction information of a disc are displayed. As well-known examples, program numbers (so-called track numbers) recorded to sub-codes of Q channel as mode 1 and time information assigned to each track number are reproduced and displayed.

In addition, a format of which character information such as an album title of a CD is recorded to sub-codes of R to W channels in a lead-in area has been proposed. This format is referred to as CD-TEXT. As the CD-TEXT format, lead-in information (mode 4) and program area information (mode 2) have been defined. When lead-in area is reproduced, the lead-in information is stored in a memory (RAM) of a reproducing unit. When the user desires the information, it can be displayed. On the other hand, information of the program area can be displayed at a timing designated by a producer of the CD. The present invention is applied to the mode 4 of the CD-TEXT format.

In the case of a CD player, when data is reproduced from a CD corresponding to the CD-TEXT format, the CD-TEXT information is read at a timing of which the CD is loaded to the CD player. The CD-TEXT information is decoded and stored in the memory. When necessary, the CD-TEXT information is displayed. Since the album title, performer name, and so forth of the CD are displayed, the user can easily know the contents of the CD.

An application program that allows a computer to function as a CD player is preferably applicable to the CD-TEXT format. However, in a system of which a conventional drive such as a CD-ROM drive is connected to a host computer, an application program of the host computer does not obtain CD-TEXT information. In other words, a method for allowing such an application program to obtain CD-TEXT information is not known. In the case of the CD-ROM drive, a CD-ROM is usually loaded. Thus, when a disc corresponding to the CD-TEXT format is loaded, CD-TEXT data should be properly obtained.

OBJECTS AND SUMMARY OF THE INVENTION

It is therefore an object of the present invention to provide a reproducing method for causing a host computer to properly obtain character information reproduced from a management area of a record medium such as a CD-TEXT disc loaded to a drive.

It is another object of the present invention to provide a record medium from which the computer to read a program for such a reproducing method.

To attain the object, according to the present invention there is provided a reproducing method for causing a computer to obtain data reproduced from a record medium loaded to a drive connected to the computer, comprising the steps of:

receiving return data composed of data reproduced from a management area of the record medium by the drive and identification data that represents the length of the data;

determining whether or not the record medium is a record medium of which character information has been recorded in the management area corresponding to the identification data of the received return data; and obtaining character information when the record medium loaded to the drive is a record medium of which character information has been recorded in the management area.

According to the present invention there is provided a record medium from which a computer reads a program for a reproducing method for causing a computer to obtain data reproduced from a record medium loaded to a drive connected to the computer, the reproducing method comprising the steps of:

receiving return data composed of data reproduced from a management area of the record medium by the drive and identification data that represents the length of the data;

determining whether or not the record medium loaded to the drive is a record medium of which character information has been recorded in the management area corresponding to the identification data of the received return data; and obtaining character information when the record medium loaded to the drive is a record medium of which character information has been recorded in the management area.

When application software is installed to a computer corresponding to the reproducing method of the present invention, the user can reproduce for example music from a CD loaded to a driver. In addition, when the loaded CD corresponds to the CD-TEXT format, CD-TEXT information (disc name, song name, and so forth) can be displayed on a computer display in the most proper language of a plurality of languages.

The above, and other, objects, features and advantage of the present invention will become readily apparent from the following detailed description thereof which is to be read in connection with the accompanying drawings.

BRIEF DESCRIPTION OF THE DRAWINGS

FIG. 5 is a schematic diagram showing data of all channels of a sub-code signal;

FIGS. 6A and 6B are schematic diagrams showing the data structure of a CD and the data structure of a TOC;

FIG. 7 is a schematic diagram showing the structure of TOC data recorded in a lead-in area of a conventional CD;

FIG. 16 is a schematic diagram showing the contents of data of a pack element (00h) of a size pack;

FIG. 17 is a schematic diagram showing the contents of data of a pack element (01h) of a size pack;

FIG. 18 is a schematic diagram showing the contents of data of a pack element (02h) of a size pack;

FIG. 19 is a schematic diagram showing the relation between language codes and language names;

FIG. 20 is a schematic diagram showing the relation between language codes and language names;

FIGS. 22A and 22B are schematic diagrams showing an example of the structure of a read TOC command according to the embodiment of the present invention;

FIG. 23 is a schematic diagram showing an example of the structure of return data sent from the drive to the computer according to the embodiment of the present invention.

DETAILED DESCRIPTION OF THE PREFERRED EMBODIMENTS

Figure 1:
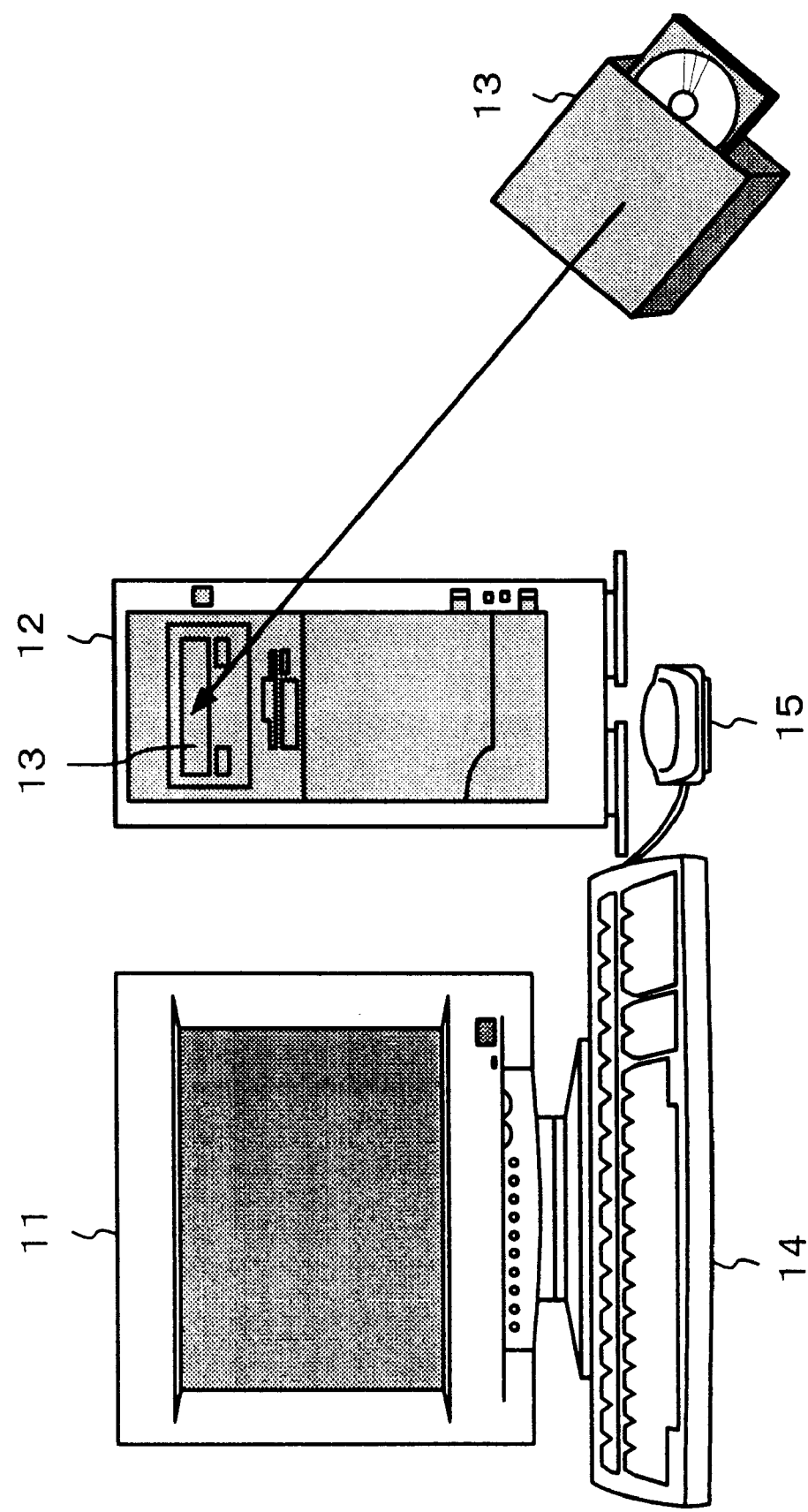
FIG. 1 is a schematic diagram showing a system structure according to an embodiment of the present invention.

Next, with reference to the accompanying drawings, an embodiment of the present invention will be described. FIG. 1 shows an outlined structure of a system according to an embodiment of the present invention. In FIG. 1, reference numeral 11 is a computer display. Reference numeral 12 is a main body of a personal computer. Reference numeral 13 is an optical disc drive disposed in the computer main body 12. Reference numeral 14 is a keyboard. Reference numeral 15 is a mouse. Such a personal computer is well-known. For example, a personal computer that operates with an operating system for example Windows 95 (registered trademark) can be used. It should be noted that the present invention can be applied to a computer that operates with another operating system.

The optical disc drive 13 can reproduce data from an optical disc such as a CD, a CD-ROM, a CD-R (recordable, non-rewritable CD), a CD-RW (rewritable CD). When an application software for the reproducing method according to the embodiment of the present invention is installed to the computer main body 12, music information of a CD loaded to the drive 13 can be reproduced by a built-in speaker or an external speaker. In addition, when the loaded CD is a CD corresponding to the CD-TEXT format (CD-TEXT disc), the drive 13 reproduces CD-TEXT data from the lead-in area. The reproduced CD-TEXT data is read to the computer main body 12. The CD-TEXT data is decoded and thereby a disc name, a program name, and so forth corresponding to the CD-TEXT data are displayed on display 11. The user can select a song with such information displayed.

In the embodiment of the present invention, as a record medium, a CD is used. However, it should be noted that the present invention is applied to other types of optical discs (for example, DVD (digital video disc)), a magnetic tape, an optical tape, and a semiconductor memory. In addition, digital main information recorded on a record medium may be video data or the like as well as audio data.

Figure 2:
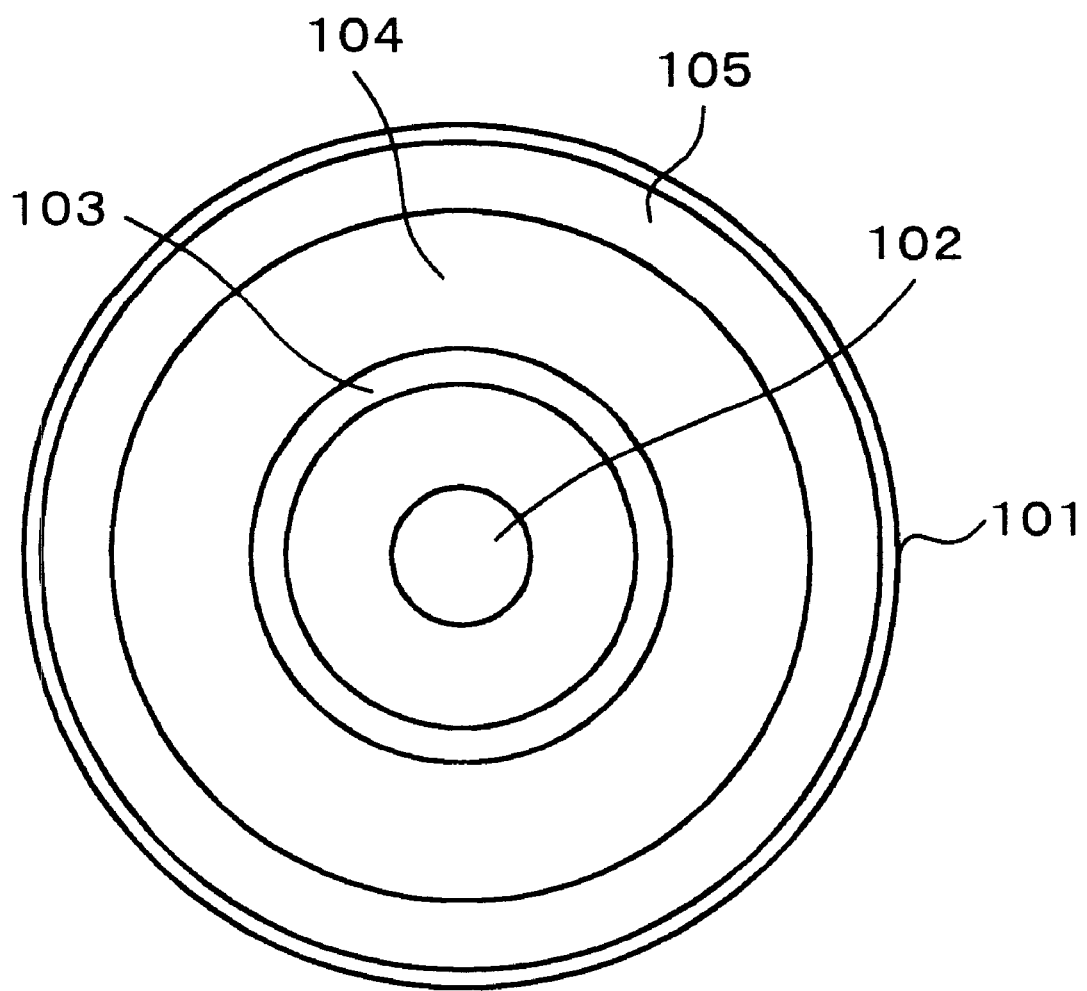
FIG. 2 is a schematic diagram showing areas of a conventional music reproducing CD according to the present invention.

For easy understanding of the present invention, the data structure of an audio reproducible CD and the CD-TEXT format will be described in succession. As shown in FIG. 2, a CD 101 has a hole 102 at the center thereof. A lead-in area 103 as a program management area for TOC (Table Of Contents) data, a program area 104 for program data, and a lead-out area 105 as a program end area are disposed from an outer periphery of the hole 102 to an outer periphery of the CD. In the case of an audio reproducible CD, audio data is recorded in the program area 104. Time information and so forth of the audio data are managed in the lead-in area 103. After the audio data has been completely read from the program area 104 and the pickup of the CD reproducing unit has reached the lead-out area 105, the CD reproducing unit completes the CD reproducing operation.

On a CD, sub-codes have been recorded along with audio data as main data. Next, data of P and Q channels as sub-codes will be described. An audio signal recorded on the CD is sampled at a frequency of 44.1 kHz with 16 bits per sample or word. 16 bits of one sample or one word are divided into high order eight bits and low order eight bits as two symbols. An error correcting process and an interleaving process are performed symbol by symbol. Every 24 symbols of audio data are grouped as one frame. One frame is equivalent to six samples of each of stereo left and right channels.

Figure 3:
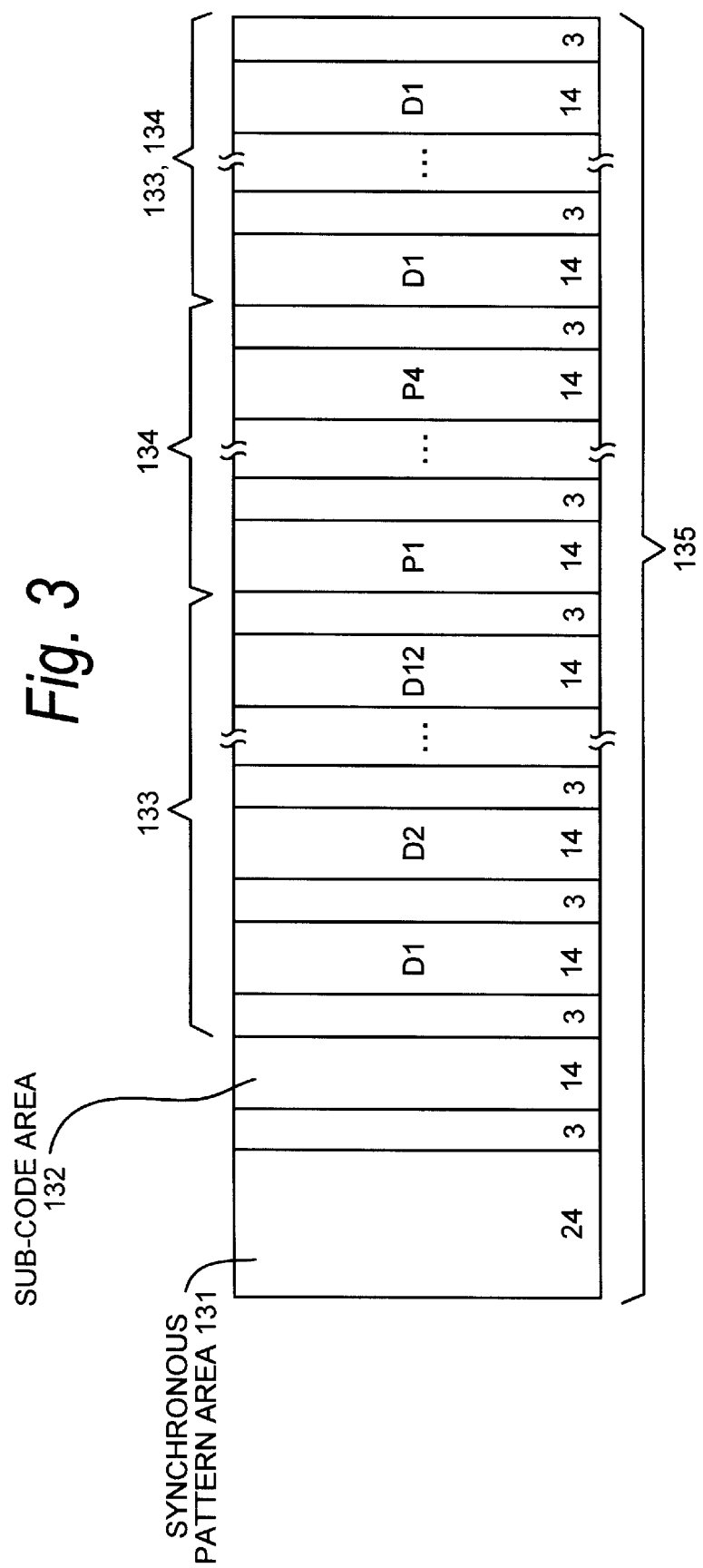
FIG. 3 is a schematic diagram showing data of one frame.

Eight bits as one symbol are converted into 14 bits by EFM modulating method. FIG. 3 shows the data structure of one frame that has been modulated by the EFM modulating method. Referring to FIG. 3, one frame 135 is composed of a synchronous pattern data area 131 of 24 channel bits, a sub-code area 132 of 14 channel bits, a program data area 133 having program data D1 to D12 of 12 symbols, a parity data area 134 having parity data P1 to P4 of four symbols, another program data area 133, and another parity data area 134. To connect each area or each data portion, connecting bits of three channel bits are disposed in each portion. Thus, one frame 135 is composed of data of a total of 588 channel bits.

Figure 4:
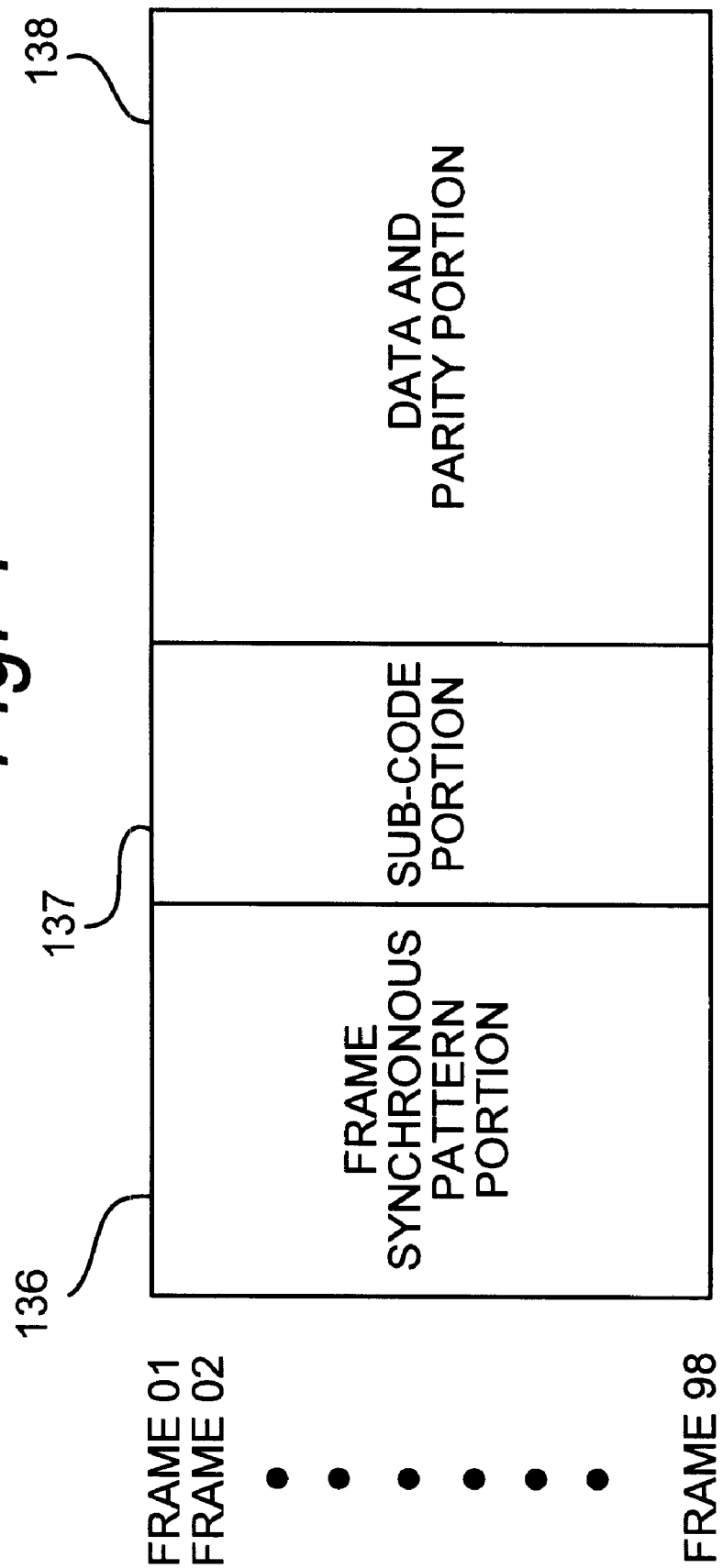
FIG. 4 is a schematic diagram for explaining a data structure of a sub-code frame.

FIG. 4 shows data structure of which 98 frames are arranged so that each area and each data portion of the frames 135 continue in vertical direction. A period of the 98 frames shown in FIG. 4 is a unit of one sub-code. The 98 frames are referred to as sub-code frame. The sub-code frame is composed of a frame synchronous pattern portion 136, a sub-code portion 137, and a data and parity portion 138. One sub-code is equivalent to $^1/_{75}$ seconds of reproduction time of a CD.

Sub-code data of P and Q channels is recorded in the sub-code portion 137 shown in FIG. 4. FIG. 5 shows the data structure of sub-code frames of the sub-code portion 137. Referring to FIG. 5, frame F01 and frame F02 are synchronous patterns S0 and S1 of the sub-code frames, respectively. As with a frame synchronous pattern, synchronous patterns S1 and S2 are out-of-rule patterns of the EFM (Eight to Fourteen Modulation) modulating method. Each of eight bits of one symbol composes a sub-code of the P to W channels. For example, the P channel is composed of parts of S0 and S1 and P1 to P96.

Sub-codes of the P channel contain information that represents whether or not a program is present. The Q channel contains absolute time information of the current CD, time information of each program, a program number (also referred to as track number), a movement number (also referred to as index), and so forth. Thus, with information contained in the Q channel, a reproducing operation such as a program start position detecting operation can be controlled. In addition, when the information of the Q channel is displayed, the user can visually know the program number of the current program, the elapsed time of the program, and the absolute time of the program.

In addition, data of sub-codes of six channels from the R to W channels can be used for displaying a still picture, a song text, and so forth. A reproducing unit using these six channels from the R to W channels is well-known as CD-graphics. Recently, a format of which additional character information is recorded to the R to W channels of the lead-in area of a CD (CD-TEXT) has been proposed. In the case of the CD-TEXT format, character information of around 6500 characters can be recorded. In addition, additional character information of a CD is 800 characters or less in each of eight languages.

FIG. 6A shows data recorded on a CD. As was described with reference to FIG. 2, a lead-in area 103, a program area 104, and a lead-out area 105 are successively disposed from the inner periphery of the CD to the outer periphery thereof. TOC data, programs No. 1 to No. n, and data are recorded in the lead-in area 103, the program area 104, and the lead-out area 105, respectively.

As shown in FIG. 6B, the TOC data of a conventional CD is recorded in the Q channel as sub-codes. A sub-code has a data structure of which one frame is composed of 98 bits. 72 bits of 98 bits are data. The TOC data has a format shown in FIG. 6B.

When six programs are recorded on a CD, the data structure of the TOC is shown in FIG. 7. When POINT is in the range from 00 to 99, PMIN, PSEC, and PFRAME represent a start address (absolute time) of each program. When POINT is A0, PMIN represents the program number of the first program of the current disc. In this case, PSEC and PFRAME are 00. When POINT is A2, PMIN, PSEC, and PFRAME represent a lead-out start address. As shown in FIG. 7, these contents are repeated three times each. In addition, these contents are repeatedly recorded in the lead-in area. When the CD is loaded, the TOC data is read and stored.

Figure 8:
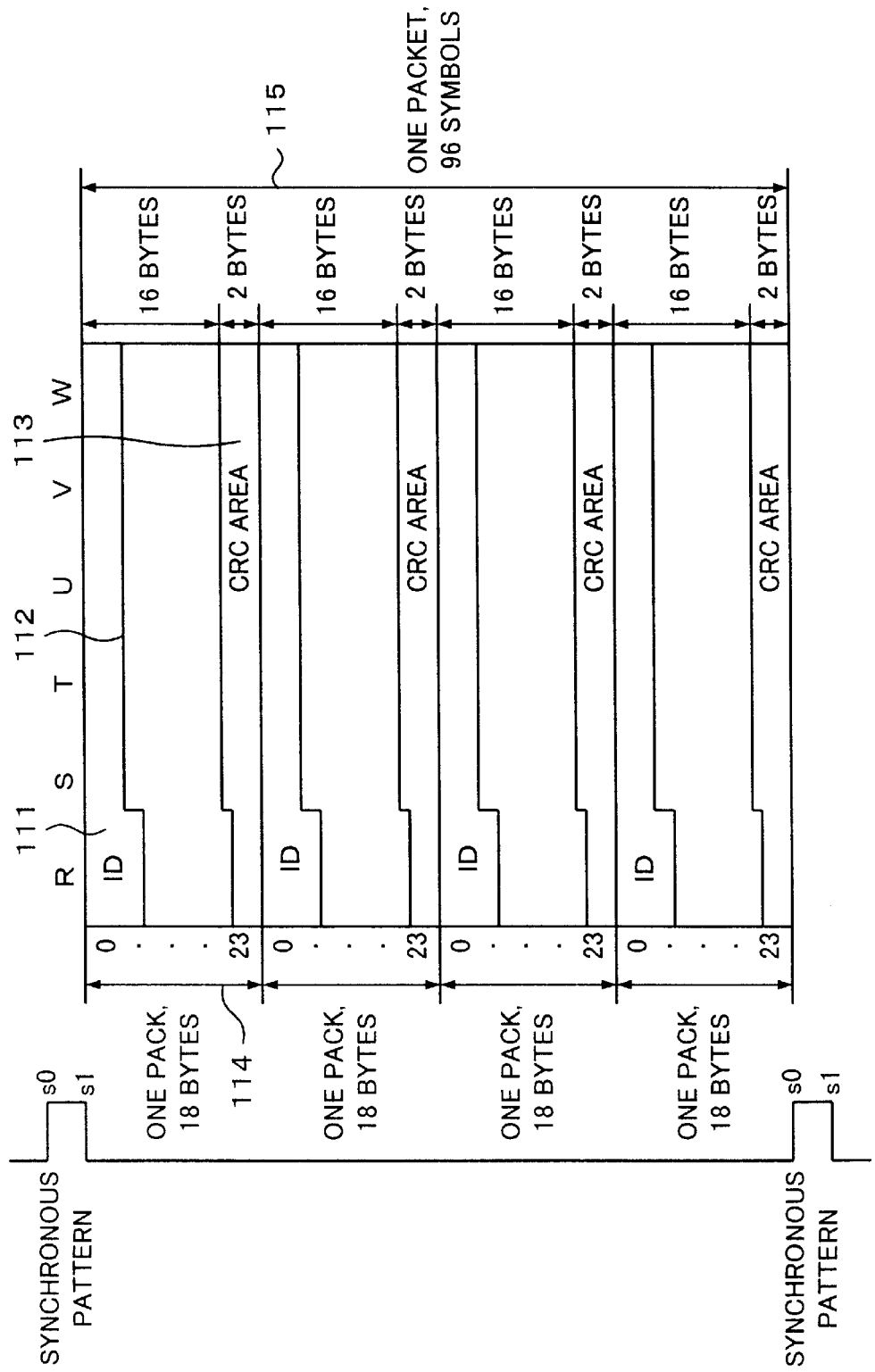
FIG. 8 is a schematic diagram showing data of all channels of a sub-code signal.

FIG. 8 shows the data structure of the CD-TEXT format (mode 4) according to the embodiment of the present invention. In the case of a conventional CD, as was described above, with data of 72 bits of one frame of sub-codes in the Q channel, the number of programs (songs) and record position of each program are managed. In reality, a program number ranging from 00 to 99, a start address (absolute time) of each program, the first program, the last program number, and a lead-out area start address are recorded. In addition to sub-codes in the Q channel, CD-TEXT data in the R to W channels as shown in FIG. 8 is recorded in the lead-in area.

The first two frames of data of the R to W channels are synchronous patterns S0 and S1. The remaining 96 frames contain 96 symbols each of which is composed of six bits. The 96 symbols are divided into four portions each of which is composed of 24 symbols. 24 symbols are referred to as one pack. Four packs are referred to as one packet.

At the beginning of each pack, an ID area 111 is disposed. In the ID area 111, an ID code of 24 bits is recorded. The ID code includes mode information for assigning a record mode of information recorded in the current pack, ID1 that represents the type of character information, and other ID codes (ID2, ID3, and ID4) that represent other identification information. The ID area 111 is followed by a text area 112 for character information associated with main data. The text area 112 is composed of eight-bit blocks. Each pack has a CRC area 113 of 16 bits for detecting an error with a CRC (Cyclic Redundancy Code). The ID area 111, the text area 112, and the CRC area 113 compose a pack area 114.

Figure 9:
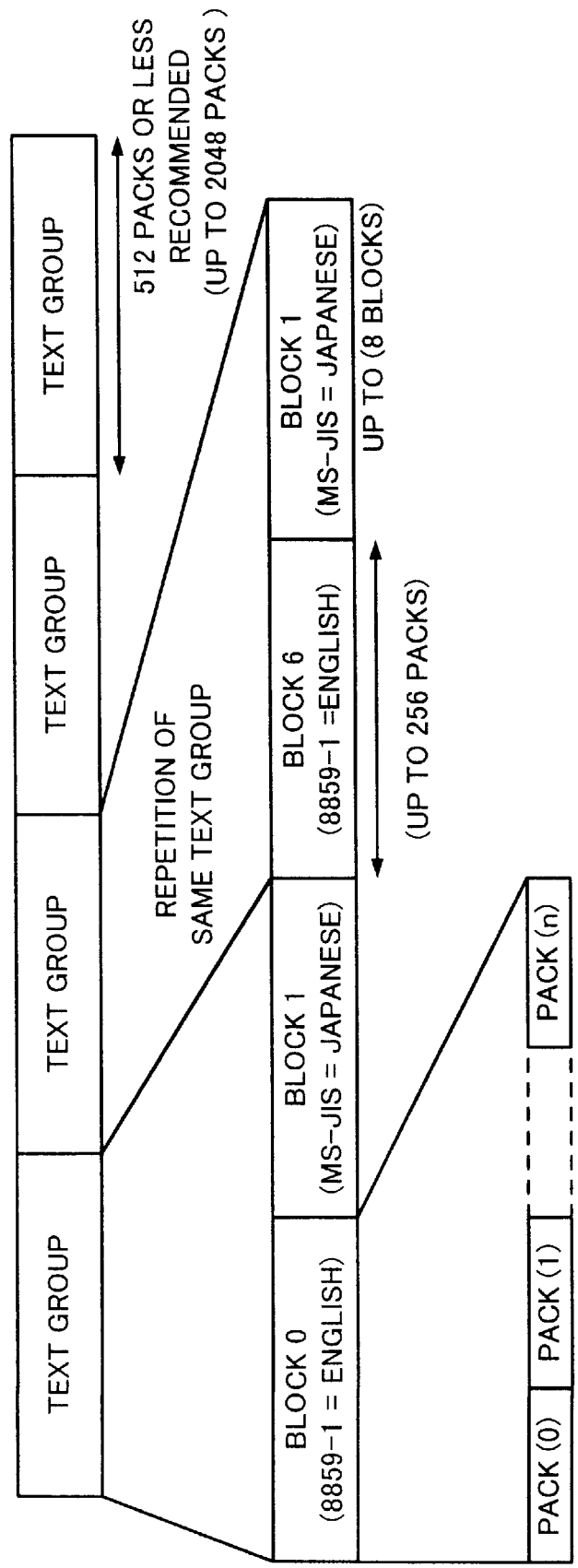
FIG. 9 is a schematic diagram showing a data format of sub-codes.

FIG. 9 shows an outlined structure of the CD-TEXT format. All character information is recorded in a text group. In the lead-in area, the same text group is repeatedly recorded. One text group is composed of up to eight blocks. FIG. 9 shows an example of which one text group is composed of two blocks (block 0 and block 1).

Block 0 contains English character information corresponding to character code 8859-1. Block 1 contains Japanese character information corresponding to character code MS-JIS. Each block is composed of pack 0 to pack n.

Figure 10A:
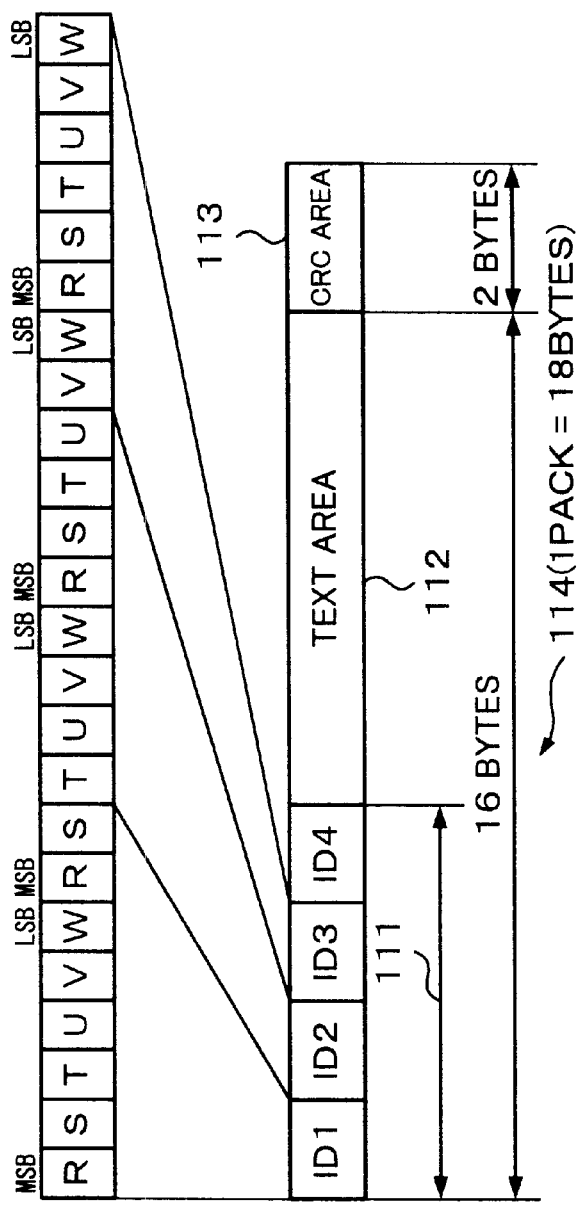
FIG. 10A and 10B are schematic diagrams showing one pack and one symbol of a data format of a CD-TEXT.

FIG. 10A shows serial data in the data format shown in FIG. 8. As shown in FIG. 10A, the first 32 bits of data (only 24 bits are shown in FIG. 10A) are divided into four bytes and assigned to identification codes ID1, ID2, ID3, and ID4 as an ID (header) area 1. The ID (or header) area 1 is followed by a text area 112. The text area 112 is divided into byte data. The data length of the text area 112 is 12 bytes. The text area 112 is followed by a CRC area 113 of two bytes. The ID area 111, the text area 112, and the CRC area 113 are referred to as pack 114. The data length of the pack 114 is 18 bytes. Thus, the signal on the Q channel can be processed byte by byte. Consequently, the processing circuit becomes simple.

In the CD-TEXT format, an error is detected with only a CRC error detection code. When an error is detected, data is read. Thus, data is read whenever an error is detected. Consequently, in the TOC, data is written pack by pack four times. In addition, a data sequence is repeatedly recorded packet by packet. In other words, one pack that synchronizes with a sub-code sync with a period of ⅕ seconds contains four packs. In such a multiple recording operation, a complicated circuit for an error correction can be omitted.

The multiple writing operation for each pack is not limited to a four time writing operation. In addition, the multiple writing operation may be performed for each packet or every several packets rather than each pack.

Figure 10B:
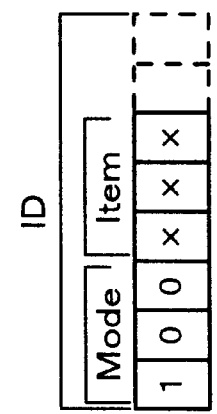

In addition, as shown in FIG. 10B, ID1 at the beginning of the ID area 111 is handled with eight bits that are larger by two bits than a conventional symbol. Data for identifying a particular mode is written to three bits after the MSB (inclusive) so as to prevent the reproducing unit having a decoding function for sub-codes of the R to W channels from malfunctioning. In the CD-TEXT format recorded in the lead-in area, as a mode represented with the three bits, before the CD-TEXT format is proposed, mode 4 ("100") that has not been defined is assigned. Thus, even if such a decoding function is provided to a conventional reproducing unit, only an unrecognizable mode is detected. Thus, the reproducing unit simply stops, not malfunctions. As undefined modes, mode 5 and mode 6 are considerable along with mode 4. Thus, instead of mode 4, one of mode 5 and mode 6 may be used.

Figure 11:
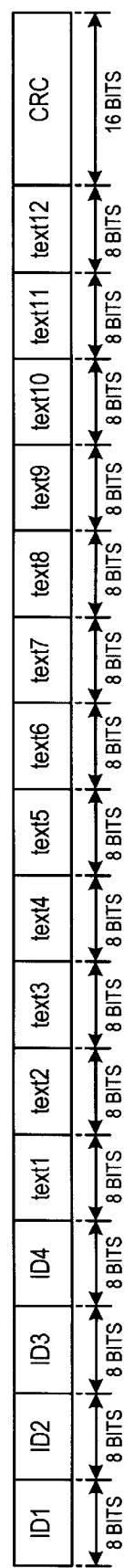
FIG. 11 is a schematic diagram showing a data format according to the embodiment of the present invention.

In the example of which mode 4 is represented with ID1, as shown in FIG. 11, one pack includes identification codes ID1, ID2, ID3, and ID4 (eight bits (one byte) each), text bytes text1 to text12, and a 16-bit CRC code.

Figure 12:
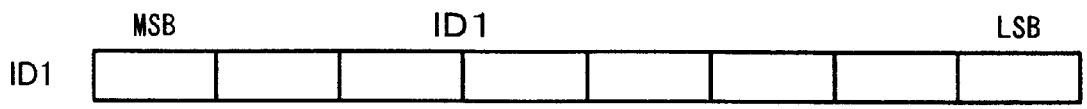
FIG. 12 is a schematic diagram showing the contents of data of ID1.

ID1 is composed of eight bits. FIG. 12 shows contents of data handled with ID1 and each pack. As described above, ID1 is denoted by (8xh) so as to represent mode 4 with high order bits (where h represents hexadecimal notation; x represent low order four bits).

ID1 represents the contents of a character string preceded by text1. (80h) represents an album name/program name. (81h) represents a performer name/conductor name/orchestra name. (82h) represents a song writer name. (83h) represents a composer name. (84h) represents an arranger name. (85h) represents a message. (86h) represents a disc ID. (87h) represents a search keyword. (88h) represents a TOC. (89h) represents a 2nd TOC. (8ah), (8bh), and (8ch) represent reserved areas. (8dh) represents closed information. (8eh) represents UPC/EAN (POS code) of the album and ISRC of each track. (8fh) represents block size information. Reserved areas represent that these areas have not been currently defined and will be defined in future.

Figure 13:
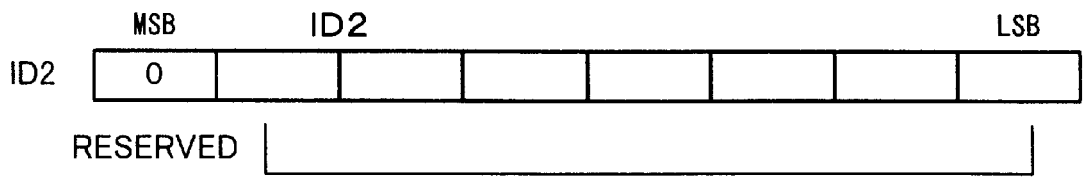
FIG. 13 is a schematic diagram showing the contents of data of ID2.

ID2 includes a one-bit extension flag and a seven-bit track number or a seven-bit pack element number. The track number represents a track number to which the first character of the text data of the pack belongs. As shown in FIG. 13, a track number ranging from 1 to 99 is recorded to ID2. Thus, other values "0" and "100" (64h) or higher have special meanings. "00" represents information representative of the entire disc. MSB is always 0. When MSB is 1, it represents an extension flag. The pack element number is used depending on the type of a pack represented by ID1.

Figure 14:
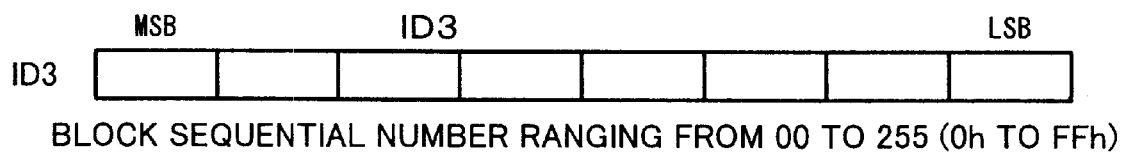
FIG. 14 is a schematic diagram showing the contents of data of ID3.

ID3 represents a pack sequential number. As shown in FIG. 14, the pack sequential number of a block ranges from 00 to 255 (0h to FFh). When ID3 is 0, it represents the first pack of ID1=80h.

Figure 15:
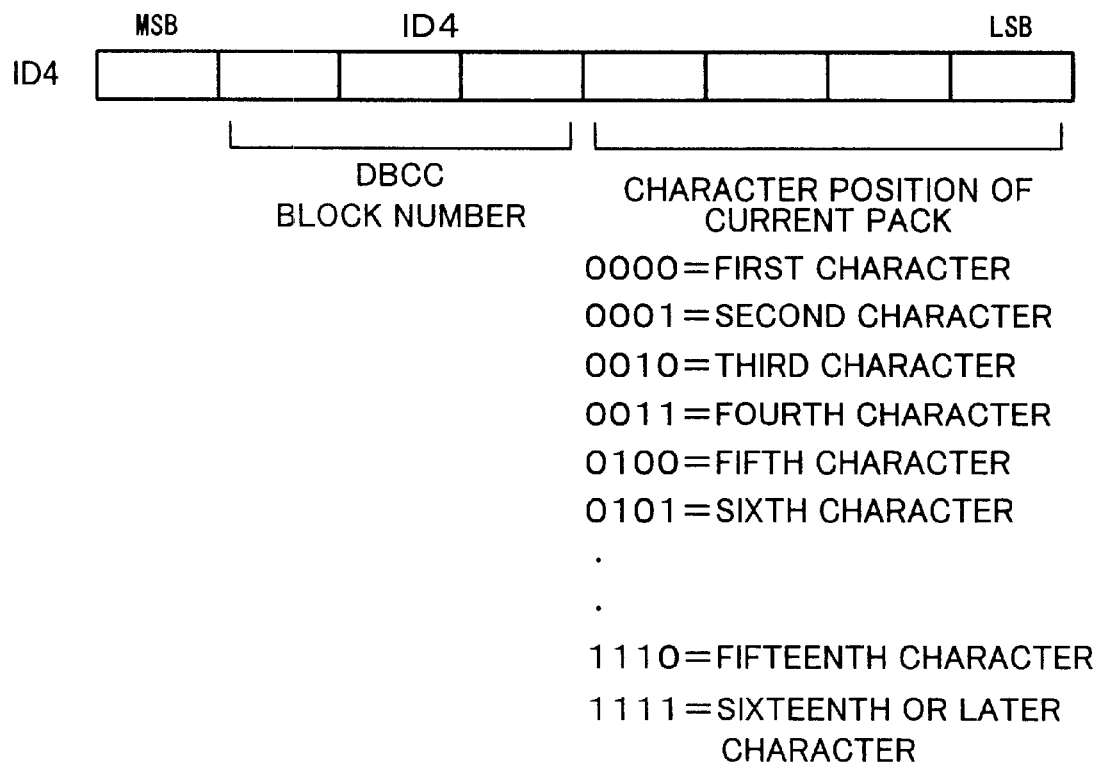
FIG. 15 is a schematic diagram showing the contents of data of ID4.

As shown in FIG. 15, ID4 includes a one-bit (MSB) DBCC (Double Byte Character Code) identification, a three-bit block number, and a four-bit pack character position information. When the current block includes a DBCC character string, the DBCC identification is "1". When the current block includes an S(Single)BCC character string, the DBCC identification is "0". The block number represents a block number to which the current pack belongs. The four-bit character position information represents the character position of text1 of the current pack. When the four-bit character position information is "0000", it represents that the character position is the first character. "0001"represents that the character position is the second character. "0010" represents that the character position is the third character. Likewise, "0011", "0100", . . . , represent that the character position is the fourth character, the fifth character, . . . .

As described above, text data is composed of 12 bytes. The text data includes a character string or binary information corresponding to the type of a pack represented by ID1. When a pack is other than (ID1=88h), (ID1=89h), and (ID1=8fh), text data thereof is a character string. A character string is composed of characters and a null code as an end mark. When the character string is a SBCC character string, one null code is used. When the character string is a DBCC character string, two null codes are used. A null code is (00h). The size of each character string is preferably 160 bytes or less.

Figure 18:
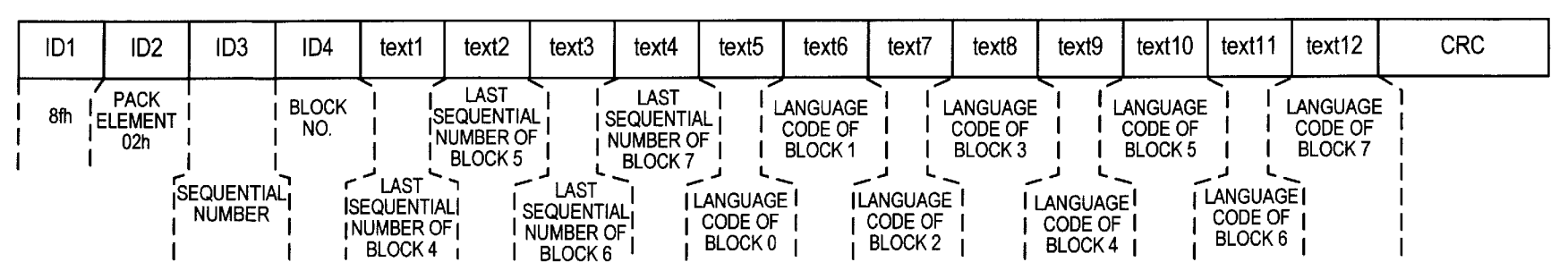

FIGS. 16, 17, and 18 show examples of the structure of a pack (ID1=8fh) of block size information corresponding to the present invention. FIG. 16 shows the data structure of a pack of pack element number=(00h). FIG. 17 shows the data structure of a pack of pack element number=(01h). FIG. 18 shows the data structure of a pack of pack element number=(02h).

ID3 represents the sequential number of a pack of (ID2=00h) (see FIG. 16). ID4 represents a block number. ID4 is followed by text1 that represents a character code of the current block. The character code is used for a character string of a pack (ID1=80h to 85h). The character code of other packs is (00h). When the block number is 0, the character code is (00h). The character code is defined as follows.

00h=ISO 8859-1
01h=ISO 646, ASCII
02h~7F=Reserved
80h=MS-JIS
81h=Korean character code
82h=Mandarin (standard) Chinese character code
83h~FFh=Reserved For example, in the ISO 8859-1, alphanumeric characters, symbols, and so forth are represented with one byte. The ISO 8859-1 code is used as a standard character code.

text2 represents the first track number. text3 represents the last track number. text4 represents mode 2 and copy protection flag. One bit (MSB) of text4 is a flag that represents whether or not a CD-TEXT packet of mode 2 has been encoded to a program area. The remaining seven bits are used as a copy protection flag. text5 to text12 represent the number of packs of each of (ID1=80h)~(ID1=87h).

As with the pack shown in FIG. 16, in a pack (ID1=8fh, ID2=01h) (see FIG. 17), ID3 and ID4 represent a sequential number and a block number, respectively. text1 to text8 represent the number of packs of each of (ID1=88h)~(ID1=8fh). text9 to text12 represent the last sequential number of each of block 0 to block 3.

As with the packs shown in FIGS. 16 and 17, in a pack (ID1=8fh, ID2=02h) (see FIG. 18), ID3 and ID4 represent a sequential number and a block number, respectively. text1 to text4 represent the last sequential number of each of block 4 to block 7. When the last sequential number is (00h), it represents that no block is present. When no block is present, it is referred to as non-data block. text5 to text12 represent language codes of block 0 to block 7. A character code represents a data format type of each character of a character string. On the other hand, a language code represents the country of character information of each block.

FIGS. 19 and 20 are tables showing the relation between language codes (one byte each) and languages. The table shown in FIG. 19 lists language codes used in European countries. The table shown in FIG. 20 lists language codes used in other countries. The language codes in these lists are only examples. Thus, other language codes may be used.

Figure 21:
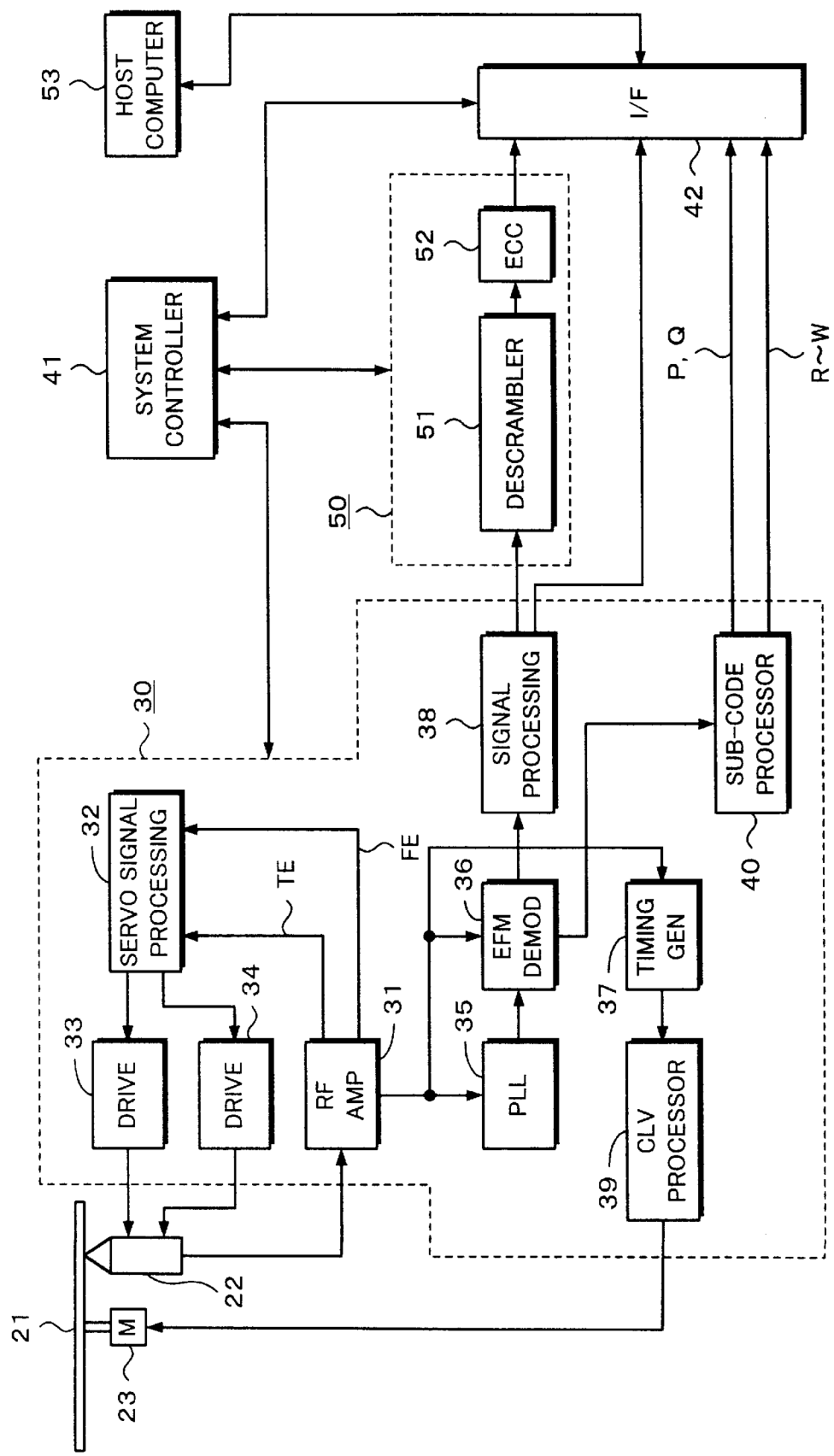
FIG. 21 is a block diagram showing a structure according to the embodiment of the present invention.

Next, with reference to FIG. 21, an example of an optical disc drive 13 according to an embodiment of the present invention will be described. The optical disc drive 13 can reproduce data from a CD-ROM, a CD, and a CD-TEXT. In FIG. 21, reference numeral 21 is a disc that is loaded to the drive. Data is reproduced from the drive. The disc 21 is rotated and driven by a spindle motor 23. An optical pickup 22 reads data from the disc 21.

A reproduction signal that is output from the optical pickup 22 is supplied to a servo and signal processing portion 30 that has the same structure as a CD player. The reproduction signal is supplied to an RF amplifier 31. The RF amplifier 31 has a function of an RF signal processing circuit. In other words, the RF amplifier 31 performs a process for digitizing an RF signal, a process for generating a tracking error signal TE and a focus error signal FE, and so forth. The error signals TE and FE are supplied to a servo signal processing circuit 32. The servo signal processing circuit 32 performs a focus controlling process and a tracking controlling process. A focus actuator and a tracking actuator of the optical pickup 22 are driven corresponding to signals received through driving circuits 33 and 34. A unit (not shown) that moves the pickup 22 to the direction of the disc diameter is controlled by a servo signal processing circuit 32.

A digitized reproduction signal received from the RF amplifier 31 is supplied to a PLL 35, an EFM demodulating circuit 36, and a timing generating circuit 37. The PLL 35 generates a clock signal that synchronizes with the reproduction signal. A digital audio signal received from the EFM demodulating circuit 36 is supplied to a signal processing circuit 38. The signal processing circuit 38 performs an error correcting process, an error data interpolating process, and so forth. A digital audio signal received from the signal processing circuit 38 is supplied to an interface 42. The interface 42 connects a computer main body 12 (a host computer 53 in FIG. 21) and an optical disc drive 13. The interface 42 is a SCSI interface, an ATAPI interface, or the like. A digital audio signal is reproduced as an audio signal by software (an application program) of the host computer 53.

The timing generating circuit 37 generates a timing signal that synchronizes with the reproduction signal. An output signal of the timing generating circuit 37 is supplied to a CLV processor 39. The CLV processor 39 drives the spindle motor 23 at CLV (Constant Linear Velocity). A sub-code separated by the EFM demodulating circuit 36 is supplied to a sub-code processor 40. The sub-code processor 40 performs a process for detecting an error of the sub-code and so forth. The sub-code processor 40 separately outputs data of sub-codes of the P and Q channels and data of sub-codes of the R to W channels. The sub-code data is supplied to the interface 42.

As described above, sub-codes in the R to W channels of the lead-in area contain CD-TEXT data. The CD-TEXT data is sent to the host computer 53 through the interface 42. A CD-TEXT data decoding process for separating character information from CD-TEXT data and displaying the character information on the display is performed by software of the host computer 53. A disc name, a song name, an artist name, and so forth corresponding to CD-TEXT data are displayed in English or another language on the computer display 11. Alternatively, instead of such software, hardware for decoding CD-TEXT data may be disposed in the host computer 53 or the drive.

When data is reproduced from a CD-ROM, an output signal of the servo and signal processing portion 30 is supplied to a CD-ROM signal processing portion 50. In a CD-ROM, the data length of a sub-code is defined as a data unit (1/75 seconds). In other words, the data length of 2352 bytes is treated as one block. At the beginning, a sync (12 bytes) is disposed. The sync is followed by a header (4 bytes). The header is followed by user data. The header contains an address similar to an absolute address of a sub-code of the Q channel of the CD. As the data structure of a CD-ROM, mode 0, mode 1, mode 2 (form 1), and mode 2 (form 2) have been defined. Data other than sync has been scrambled. In addition, each block is encoded with an error detection code or an error correction code.

After data is block-segmented, an error correction code encoding process and an EFM modulating process for a CD-ROM are performed as with data for a CD. The resultant data is recorded on a CD-ROM. Thus, the CD-ROM signal processing portion 50 includes a descrambler 51 and an error correcting circuit 52. The descrambler 51 descramble output data of the signal processing portion 38. The error correcting circuit 52 decodes output signal of the descrambler 51 with an error detection code or an error correction code. Reproduction data that is output from the error correcting circuit 52 is supplied to the host computer 53 through the interface 42.

The system controller 41 is a microcomputer. The system controller 41 controls the entire operation of the optical disc drive. In other words, the system controller 41 controls the servo and signal processing portion 30, the CD-ROM signal processing portion 50, and the interface 42. The disc reproduction data is supplied to the host computer 53 through the interface 42 corresponding to a read TOC command received from the host computer 53. Data supplied from the drive to the host computer 53 is referred to as return data.

Next, with reference to FIG. 22, a read TOC command that is one of commands issued by the host computer 53 will be described. The data length of the read TOC command is 10 bytes. The read TOC command has the data structure shown in FIG. 22A. Referring to FIG. 22A, byte 0 to byte 9 are assigned to the read TOC command. In addition, bit 0 to bit 7 are assigned to each of byte 0 to byte 9. In FIG. 22A and other drawings, hatched areas represent areas allocated, but not defined.

Byte 0 is an operation code that represents a command type. As shown in FIG. 22A, when the operation code is (43h), it represents a read TOC command. Bit 1 of byte 1 of the read TOC command is MSF that defines an address type. When MSF is 0, it represents that a logical block address is required. When MSF is 1, it represents that an address denoted by minute, second, and frame is required.

Bit 0 to bit 3 (four bits) of byte 2 are a format field. The format field represents a return data type as defined in FIG. 22B. When the format field is format 0 (0000), it represents that TOC data (P and Q channels) is returned as return data. When the format field is format 1, it represents that session information is returned as return data. When the format field is format 2, it represents that all sub-codes of the Q channel are returned as return data. When the format field is format 3, it represents that sub-codes of the Q channel of PMA (area defined for a CD-R) are returned as return data. When the format field is format 41 it represents that an ATIP (an address represented as a wobbling group such as a CD-R, a CD-RW, etc.) is returned as return data. When the format field is format 5, it represents that CD-TEXT data recorded in the R to W channels of the lead-in area is returned as return data.

Format 5 (0101) of the format field relates to the sprit of the present invention. When the host computer 53 issues a command corresponding to format 5 to the optical disc drive, the system controller 41 of the drive interprets the command and controls the optical pickup 22 to read data in the R to W channels of the lead-in area. Although part of music CDs correspond to the CD-TEXT format, it is possible to allow other CDs to correspond to the CD-TEXT format.

Byte 6 of the read TOC command is a track number and a session number at which the read operation starts. Bytes 7 and 8 (two bytes) (allocation length) represent the length of return data designated by the host computer 53. However, real return data sent back from the drive to the host computer does not match the allocation length. The CD-TEXT data in the R to W channels of the sub-code does not have a constant data length. A code (identification data) that is contained in the header of the return data represents the data length of CD-TEXT read from the disc. Byte 9 (control) is a parameter for an interface such as SCSI.

With reference to FIG. 23, the structure of return data will be described. When the system controller 41 of the optical disc drive receives the read TOC command of format 5 through the interface 42, the optical pickup 22 reads CD-TEXT data from the disc and controls the drive to send the CD-TEXT data as return data to the host computer 53. The first four bytes (bytes 0 to 3) of the return data are a header.

The data length of the return data preceded by the first two bytes of the header is represented by bytes 0 and 1 of the header. In the example shown in FIG. 23, the data length is the last two bytes of the header and (n+1) bytes. The second and third bytes (two bytes) of the header are reserved (undefined). The CD-TEXT data of (n+1) bytes is subcodes of the R to W channels read from the lead-in area. When necessary, descriptor data may be disposed between the header and the CD-TEXT data.

Figure 24:
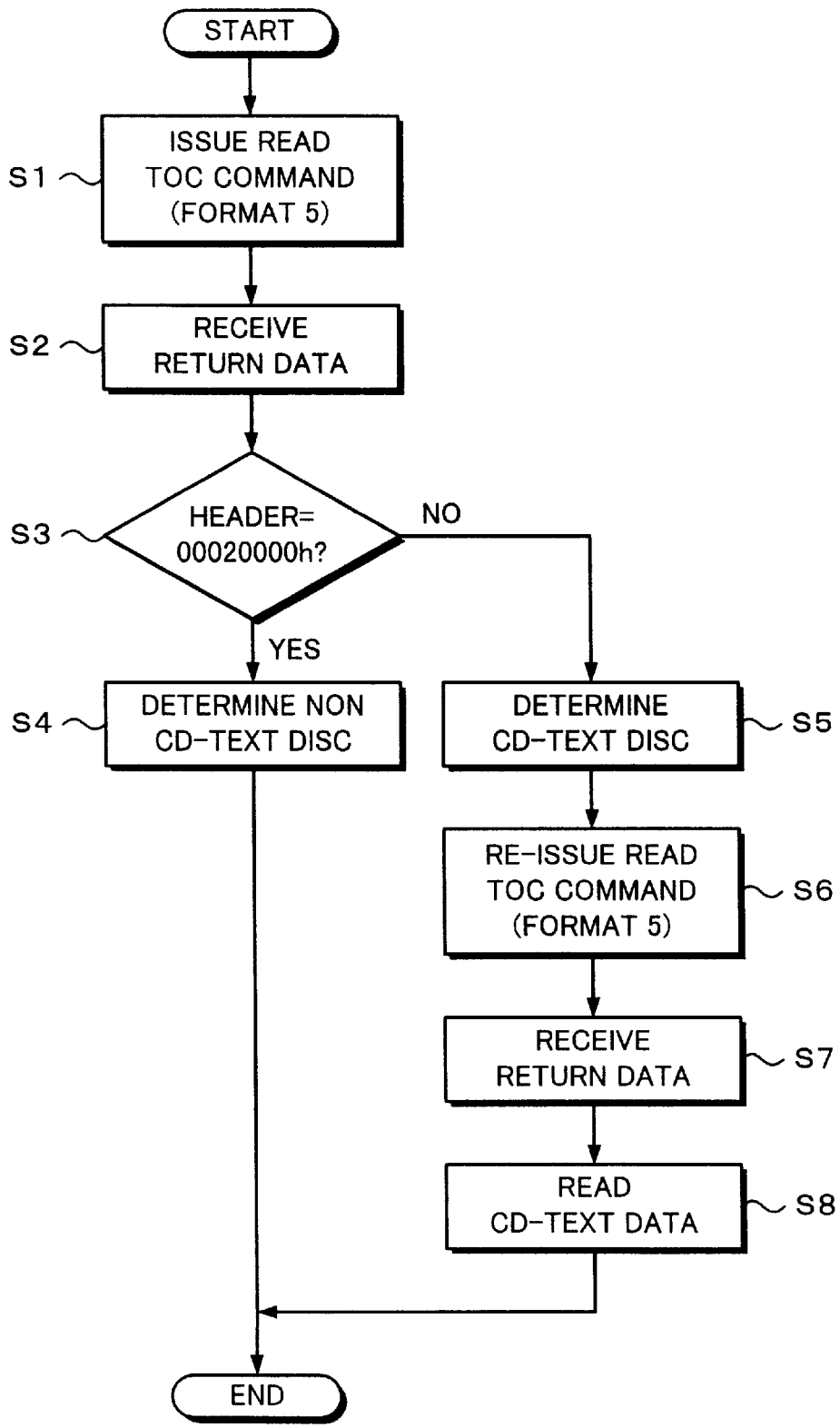
FIG. 24 is a flow chart for explaining the operation according to the embodiment of the present invention.

According to the embodiment of the present invention, a process for causing the host computer 53 to obtain CD-TEXT data from the drive will be described with reference to a flow chart shown in FIG. 24. In FIG. 24, the process is started in the condition that the application has been started and the application has detected that the disc has been loaded.

The application secures previously memory enough to store the CD-TEXT data read from the disc corresponding to above-mentioned CD-TEXT format.

The host computer 53 issues the read TOC command (format 5) to the drive so as to send back CD-TEXT data (at step S1). When the drive receives the read TOC command, the system controller 41 sends return data to the host computer through the host computer 53. The return data has a header that contains a code representing the data length. The host computer 53 receives return data (at step S2). The host computer 53 reads only the header of the return data. Alternatively, the drive may send only the header to the host computer 53 corresponding to the read TOC command that has been issued.

The host computer 54 determines whether or not the header of the first four bytes of the return data is (00020000h) (at step S3). The header represents that the data length is two bytes (namely, that the read data contains only a header, rather than CD-TEXT data). Thus, when the header is (00020000h) as the determined result at step S3, the flow advances to step S4. At step S4, it is determined that the currently loaded data is not a CD-TEXT disc. On the other hand, when the determined result at step S3 is No, it is determined that the currently loaded disc is a CD-TEXT disc.

When it is determined that the currently loaded disc is a CD-TEXT disc at step S5, the flow advances to step S6. At step S6, the read TOC command (format 5) is re-issued. The re-issued read TOC command is the same as the original read TOC command. Return data is received corresponding to the re-issued command (at step S7). The received return data (CD-TEXT data) is stored to a memory allocated corresponding to the application (at step S8). When it is determined that the currently loaded disc is a CD-TEXT disc, the CD-TEXT data is obtained from the disc.

At step S3, in addition to determining whether or not the currently loaded disc is a CD-TEXT disc corresponding to the header of the return data, the data length of the CD-TEXT data may be determined corresponding to the header. At least the memory area corresponding to the determined data length may be allocated by the application. The allocation length of the re-issued command may represent the data length. In addition, another trigger other than the read TOC command may be used. In this case, it is determined whether or not a disc has been loaded. Corresponding to the detected result, data of the R to W channels in the lead-in area of the disc is reproduced. Return data is stored in the memory of the host computer 53. With the return data stored in the memory, it is determined whether or not the currently loaded disc is a CD-TEXT disc. In addition, the CD-TEXT data is obtained (read from the memory).

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

As described above, according to the present invention, the computer can determine whether or not a record medium that has been loaded to the drive is a record medium of which character information has been recorded to its management area. When the loaded disc is such a disc as the determined result, the character information can be obtained. According to the present invention, with the interface disposed between the computer and the drive, the type of the loaded record medium can be determined and the character information can be obtained. In addition, a special signal transmission path other than the interface is not required.

What is claimed is:

1. A reproducing method for causing a computer to obtain data reproduced from a record medium loaded on a drive connected to the computer, the record medium having a management area and a program area, the method comprising the steps of:

causing the computer to issue a predetermined command to the drive so that the drive reads the management area;

receiving return data composed of data reproduced from the management area of the record medium by the drive and including a header having identification data representing a length of the data;

determining whether the record medium has character information recorded in the management area based on the identification data of the return data received in the step of receiving; and obtaining character information from the return data when the record medium loaded on the drive is determined to have the character information recorded in the management area, wherein the steps of receiving, determining, and obtaining are performed by the computer.

2. The reproducing method as set forth in claim 1, wherein the receiving step is performed by detecting the record medium loaded on the drive, reproducing the management area, and receiving the return data generated from the management area, and wherein the determining step is performed by storing the return data received in the step of receiving and determining whether the record medium loaded on the drive is a record medium determined to have character information recorded in the management area corresponding to the return data stored in the step of storing.

3. The reproducing method as set forth in claim 1, further comprising the step of:

causing the computer to allocate a memory area with a data length exceeding a length of the identification data.

4. The reproducing method as set forth in claim 1, wherein the character information recorded in the management area is character information associated with a program recorded in a program area of the record medium.

5. The reproducing method as set forth in claim 1, wherein the identification data is placed at a top portion of the return data.

6. A record medium from which a computer reads data using a reproducing method for causing the computer to obtain data reproduced from the record medium loaded on a drive connected to the computer, the record medium having a management area and a program area, the reproducing method comprising the steps of:

causing the computer to issue a predetermined command to the drive so that the drive reads the management area;

receiving return data composed of data reproduced from a the management area of the record medium loaded on the drive and including a header having identification data representing a length of the data;

determining whether the record medium loaded on the drive has character information recorded in the management area based on the identification data of the return data received in the step of receiving; and obtaining character information from the return data when the record medium loaded on the drive is determined to have the character information recorded in the management area, wherein the steps of receiving, determining, and obtaining are performed by the computer.

* * * * *